(12) United States Patent
Harwood

(10) Patent No.: US 7,141,949 B2
(45) Date of Patent: Nov. 28, 2006

(54) LOW NOISE BACK EMF SENSING BRUSHLESS DC MOTOR

(75) Inventor: Jonathan David Harwood, Auckland (NZ)

(73) Assignee: Fisher & Paykel Appliances Limited, Auckland (NZ)

( * ) Notice: Subject to any disclaimer, the term of this patent is extended or adjusted under 35 U.S.C. 154(b) by 0 days.

(21) Appl. No.: 11/361,214

(22) Filed: Feb. 24, 2006

(65) Prior Publication Data

US 2006/0197482 A1    Sep. 7, 2006

Related U.S. Application Data

(60) Provisional application No. 60/659,375, filed on Mar. 7, 2005.

(51) Int. Cl.
*H02P 25/12* (2006.01)

(52) U.S. Cl. ............... 318/439; 318/138; 318/254; 318/500; 318/459; 388/907.5; 388/928.1

(58) Field of Classification Search ........... 318/138, 318/439, 254, 500, 459, 600, 569, 599, 432; 388/907.5, 928.1
See application file for complete search history.

(56) References Cited

U.S. PATENT DOCUMENTS

| 4,495,450 | A | | 1/1985 | Tokizaki et al. |
| 4,528,485 | A | * | 7/1985 | Boyd, Jr. ............... 318/138 |
| 4,540,921 | A | | 9/1985 | Boyd, Jr. et al. |
| 4,546,293 | A | * | 10/1985 | Peterson et al. ........... 318/254 |
| 4,857,814 | A | * | 8/1989 | Duncan .................. 318/281 |
| 5,534,763 | A | | 7/1996 | Williams et al. |
| 6,034,493 | A | | 3/2000 | Boyd et al. |
| 6,104,113 | A | * | 8/2000 | Beifus ................... 310/68 B |

\* cited by examiner

*Primary Examiner*—Rina Duda
(74) *Attorney, Agent, or Firm*—Trexler, Bushnell, Giangiorgi, Blackstone & Marr, Ltd.

(57) ABSTRACT

A low noise electronic three phase bridge controlled brushless DC motor suitable for whiteware appliance pumps and other appliance applications. Back EMF zero crossing sensing is used to determine rotor position and thus stator winding commutation times. Motor torque and speed are controlled by pulse width modulating the operation of that bridge switching device which has just been switched from an OFF state to an ON state on each new commutation. All three stator windings have current flowing in each winding commutation to improve motor current waveform and thereby reduce motor noise, but the current in one winding is always terminated before the end of the commutation period to allow the back EMF in that winding to be sensed to zero crossing.

12 Claims, 10 Drawing Sheets

A+ A+ B+ B+ C+ C+
B- C- C- A- A- B-

PHASE

|  | A | B | C |
|---|---|---|---|
| 0° - 60° | A+ | B- (PWM) | OFF |
| 60° - 120° | A+ | OFF | C- (PWM) |
| 120° - 180° | OFF | B+ (PWM) | C- |
| 180° - 240° | A- (PWM) | B+ | OFF |
| 240° - 300° | A- | OFF | C+ (PWM) |
| 300° - 360° | OFF | B- (PWM) | C+ |

TWO PHASE ACTIVATION & PWM

FIG 8

PHASE

| | A | B | C |
|---|---|---|---|
| 0° - 60° | A+ | [ B- (PWM) ] | C- (PWM) |
| 60° - 120° | [ A+ (PWM) ] | B+ (PWM) | C- |
| 120° - 180° | A- (PWM) | B+ | [ C- (PWM) ] |
| 180° - 240° | A- | [ B+ (PWM) ] | C+ (PWM) |
| 240° - 300° | [ A- (PWM) ] | B- (PWM) | C+ |
| 300° - 360° | A+ (PWM) | B- | [ C+ (PWM) ] |

PARTIAL THREE PHASE ACTIVATION & PWM

FIG 11

LOW NOISE BACK EMF SENSING BRUSHLESS DC MOTOR

This application claims the benefit of U.S. provisional application Ser. No. 60/659,375, filed on Mar. 7, 2005 and entitled Low Noise Back EMF Sensing Brushless DC Motor.

TECHNICAL FIELD

This invention relates to electronically controlled brushless DC (BLDC) motors (having permanent magnet rotors) and in particular, but not solely, to three winding motors for fractional horsepower applications such as in home appliances and healthcare equipment. In a laundry machine such electronically controlled motors may be used to power the wash and spin motion of an agitator or drum and/or the wash bowl drain and recirculating pumps.

PRIOR ART

Methods of controlling electronically commutated brushless DC motors have been disclosed in U.S. Pat. No. 4,495,450 (Tokizaki et al, assigned to Sanyo Electric Co Ltd) and for use in home appliances and in particular laundry washing machines in U.S. Pat. No. 4,540,921 (Boyd et al, assigned to General Electric Company), U.S. Pat. No. 4,857,814 (Duncan et al, assigned to Fisher & Paykel Limited). As background to the present invention some of the basic electronically controlled motor (ECM) concepts described in these patents is summarised below with reference to FIGS. 1 and 2.

A three phase (three stator windings) DC motor and three phase bridge commutator or inverter is shown schematically in FIG. 1 with bridge commutation switches, which could be IGBT power FETs, being connected across of DC supply having a voltage +V. By turning on upper switch 1 for phase A and lower switch 2 for phase B, a static magnetic field will be created in the stator due to direct current flowing through phase windings A and B. By subsequently turning off lower switch 2 for phase B and turning on lower switch 3 for phase C, this magnetic field will move in a clockwise direction. Then turning off upper switch 1 for phase A and turning on upper switch 4 for phase B will cause the magnetic field to continue to move in the clockwise direction. By repeating this "rotation" of the commutation switches the magnetic field in the stator will tend to rotate at the same speed as the switching of each new switch pair. Other patterns of commutation switch activation could also lead to clockwise rotation, but the one described produces maximum motor torque.

It will be noted that in the example described only two windings are energised at any one time ("two phase firing"). A full pattern of the six switch states for two phase firing clockwise rotation is shown in FIG. 2. This can be interpreted as follows. To obtain maximum torque in the motor the connections would be A+ and C− to the 60 degree angle, then B+ and C− to the 120 degree angle, then B+ and A− to 180 degree angle, then C+ and A− to the 240 degree angle, then C+, B− to the 300 degree angle, and then A+ and B− to the 360 degree angle, the sequence commencing at A+ and C− again. Thus there is a sequence of six different switch patterns and each goes to 60 degree angle of rotation giving a total of 360 degrees in rotation.

Counter-clockwise rotation of the motor is achieved by reversing the switching pattern sequence of the commutation switches.

As mentioned in the example described, for creating a rotating magnetic field in the stator only two phases have current intentionally flowing in them at once. "Three phase firing" where all phases have current flowing at any one time is also possible and provides greater torque, but two phase firing has an advantage in that at any time one winding for 60° every 180° has no intentional motor drive current flowing through it. In the cited patents this temporarily unused winding for 60° every 180° is sensed for any voltage induced by the rotating permanent magnet rotor to provide an indication of rotor position. The induced voltage is due to back electromotive force (BEMF). It should be appreciated that this winding changes every 60 degrees and using the pattern in FIG. 2 as a reference the pattern of unused windings will be C, B, A, C, B, A.

The sensed BEMF waveform is cyclical and varies between trapezoidal and a near sinusoid. The "zero crossings" of this waveform are due to the edge of the permanent magnet poles and provide a consistent point on the rotor to track its rotational position.

When such a DC brushless motor is running, each winding commutation needs to be synchronous with the position of the rotor. As soon as the BEMF signal described above passes through zero, a decision is made to commutate to the next switching pattern to ensure continued rotation is accomplished. Switching must only occur when the rotor is in an appropriate angular position. This results in a closed loop feedback system for controlling speed. The commutation frequency will keep pace with the rotor due to the closed loop feedback from the BEMF sensor.

Acceleration or de-acceleration of the rotor is accomplished by either increasing or decreasing the strength of the rotating magnetic field in the stator (by pulse width modulation (PWM) of the stator current) since the force on the rotor is proportional to the strength of the magnetic field. Maintaining a pre-determined speed under constant load involves controlling the strength of the magnetic field in the stator to ensure that the desired commutation rate is maintained. To maintain a pre-determined speed of rotation under varying loads requires corresponding alteration of the strength of the magnetic field in the stator (by altering the PWM duty cycle) to compensate for changes in the load on the rotor.

The use of BEMF sensing to determine rotor position has many advantages, of which one is obviating the need for external sensors, such as Hall effect sensors. But prior art ECMs using BEMF sensing have the problem in that the BEMF digitisers use a relatively high number of components, particularly high voltage resistors, which require excessive space on the associated printed circuit boards and increase cost. In WO 2005/062460 a method of sensing the BEMF in only one of the three stator windings is disclosed to address this problem.

Other problems are inherent in ECMs using BEMF sensing for rotor position and where it is not feasible to employ a PWM regime that will produce a pure sinusoidal winding current. Motor noise will be greater than when non-BEMF sensing "three phase firing" (see for example U.S. Pat. No. 5,534,763) is used. This is due to the high second harmonic content of the motor current waveform which produces perturbations in the motor torque. This noise problem is even more exacerbated when for reasons of economy only the lower (or only the upper) commutation switching devices in the commutation bridge are pulse width modulated.

It is therefore an object of the present invention to provide an electronically controlled motor system which goes some way towards overcoming the above described noise disadvantage.

SUMMARY OF INVENTION

Accordingly in one aspect the invention consists in a method of electronically commutating current to a permanent magnet rotor brushless dc motor having three phase stator windings for producing rotating magnetic flux, a three phase bridge inverter including a pair of series connected switching devices per phase and wherein motor torque is controlled by pulse width modulation of said motor current comprising the steps of:

controlling said switching devices to commutate current through successive combinations of three of said windings such that magnetic flux produced by said stator windings rotates in a desired direction by 60° per commutation at a speed inversely proportional to the period between commutations, pulse width modulating the operation of that switching device which has been switched from an off state to an on state on each new commutation, applying voltage to one out of said three windings on each new commutation for an active period less than the period between commutations, after expiry of said active period sensing in said one of said windings the periodic back EMF induced by rotation of the permanent magnet rotor, digitising said sensed back EMF signal by detecting the zero-crossings of said back EMF signal, and causing each said commutation to occur at times which are substantially defined by or derived from each logic transition in said digitised signal due to zero crossings.

In a second aspect the invention consists in an electronically commutated brushless dc motor comprising:

a stator having three phase windings adapted to be selectively commutated to produce a rotating magnetic flux, a rotor rotated by said rotating magnetic flux;

a three phase bridge inverter including a pair of series connected switching devices per phase with the junctions of said switching devices connected to respective stator windings;

digitising means coupled to one or more of said windings for digitising the back EMF induced in said one or more windings by detecting the zero crossings of said back EMF signal; and a microcomputer operating under stored program control, said microcomputer receiving said digitized back EMF signal and outputting switching signals for said switching devices, said microcomputer storing sequences of switching device state patterns for execution to produce switching signals to cause current to be commutated through successive combinations of all three of said windings such that magnetic flux produced by said stator windings rotates in a desired direction by 60° per commutation at a speed inversely proportional to the period between commutations; and said stored program including routines for:

pulse width modulating the switching signal for the switching device which has been switched from an off state to an on state on when the next switching pattern of said sequence is executed on each new commutation, controlling the duration of the applied voltage to one only of said three windings on each new commutation for an active period less than the period between commutations, activating said digitising means after expiry of said active period;

and causing each said commutation to occur at times which are substantially defined by or derived from each logic transition in said digitised signal due to zero crossings.

In a third aspect the invention consists in a washing appliance pump including:

a housing having a liquid inlet and a liquid outlet, an impeller located in said housing, and an electronically commutated motor which rotates said impeller, said electronically commutated motor comprising:

a stator having three phase windings adapted to be selectively commutated to produce a rotating magnetic flux, a rotor rotated by said rotating magnetic flux;

a three phase bridge inverter including a pair of series connected switching devices per phase with the junctions of said switching devices connected to respective stator windings;

digitising means coupled to one or more of said windings for digitising the back EMF induced in said one or more windings by detecting the zero crossings of said back EMF signal; and a microcomputer operating under stored program control, said microcomputer receiving said digitized back EMF signal and outputting switching signals for said switching devices, said microcomputer storing sequences of switching device state patterns for execution to produce switching signals to cause current to be commutated through successive combinations of all three of said windings such that magnetic flux produced by said stator windings rotates in a desired direction by 60° per commutation at a speed inversely proportional to the period between commutations; and said stored program including routines for:

pulse width modulating the switching signal for the switching device which has been switched from an off state to an on state on when the next switching pattern of said sequence is executed on each new commutation, controlling the duration of the applied voltage to one only of said three windings on each new commutation for an active period less than the period between commutations, activating said digitising means after expiry of said active period; and causing each said commutation to occur at times which are substantially defined by or derived from each logic transition in said digitised signal due to zero crossings.

In a fourth aspect the invention consists in a three winding brushless dc motor drive comprising:

a three phase bridge inverter including a pair of series connected switching devices per phase with the junctions of said switching devices adapted to be connected to respective stator windings of said motor;

digitising means adapted to be coupled to one or more of said windings for digitising the back EMF induced in said one or more windings by detecting the zero crossings of said back EMF signal; and a microcomputer operating under stored program control, said microcomputer receiving said digitized back EMF signal and outputting switching signals for said switching devices, said microcomputer storing sequences of switching device state patterns for execution to produce switching signals to cause current to be commutated through successive combinations of all three of said windings such that magnetic flux produced by said stator windings rotates in a desired direction by 60° per commutation at a speed inversely proportional to the period between commutations; and said stored program including routines for:

pulse width modulating the switching signal for the switching device which has been switched from an off state to an on state on when the next switching pattern of said sequence is executed on each new commutation, controlling the duration of the applied voltage to one only of said three windings on each new commutation for an active period less than the period between commutations, activating said digitising means after expiry of said active period; and causing each said commutation to occur at times which are substantially defined by or derived from each logic transition in said digitised signal due to zero crossings.

BRIEF DESCRIPTION OF DRAWINGS

FIG. 8 is a table of switching patterns for a two phase activated pulse width modulated motor drive, FIG. 11 is a table of switching patterns for a pseudo three phase activated pulse width modulated motor drive with square brackets indicating switching devices which are on for less than the commutation period in accordance with the present invention.

DESCRIPTION OF THE PREFERRED EMBODIMENTS OF THE INVENTION

Preferred implementations of the invention will now be described.

Figure 3:
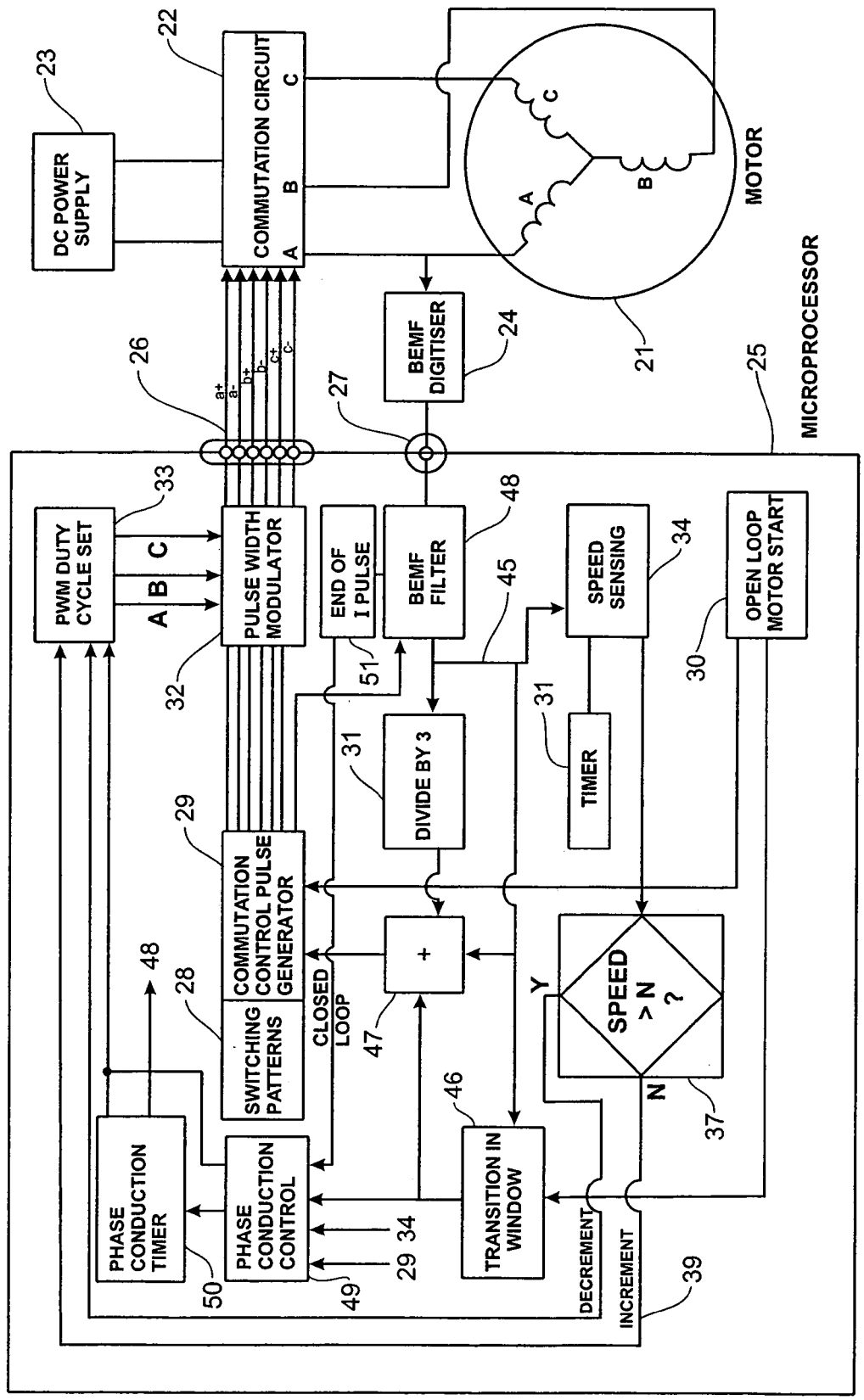
FIG. 3 is a block circuit diagram of an electronically commutated brushless DC motor according to the present invention.
Figure 6:
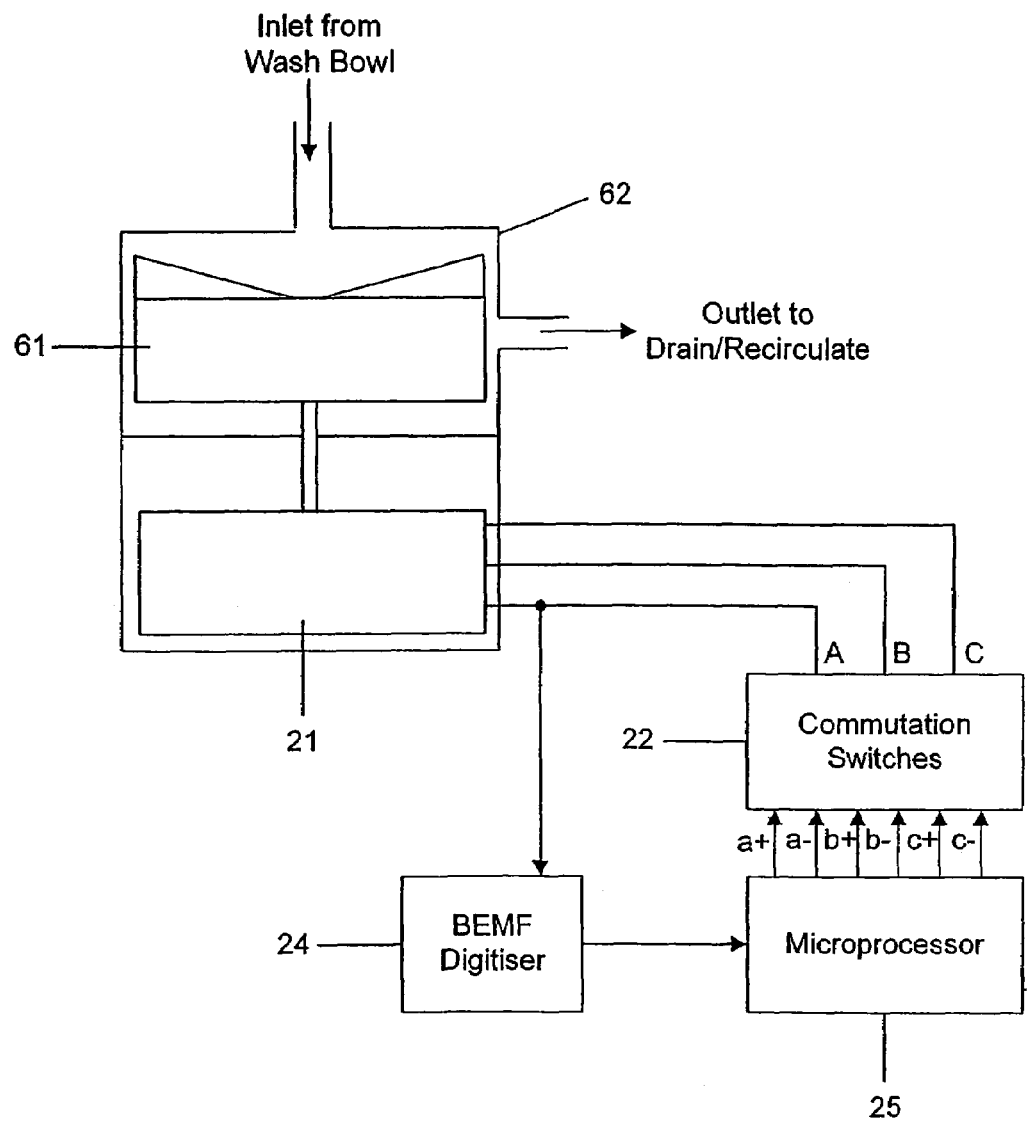
FIG. 6 shows diagrammatically an application of the present motor driving a drain and/or recirculation pump in a clothes washing machine.

FIG. 3 shows one preferred form of the electronically commutated motor of the present invention in block diagram form. The main hardware blocks are a permanent magnet three winding motor 21, motor winding commutation circuit 22, DC power supply 23, back EMF digitiser 24 and a programmed microcomputer 25. In one preferred application where the motor 21 drives an impeller 61 in a pump 62 in a washing appliance (see FIG. 6) the microcomputer 25 will usually be the appliance microprocessor which will be responsible for all other appliance control functions; including control of a main motor for spin and wash actions in the case of a clothes washing machine.

The present electronically commutated motor (ECM) system is described in relation to a preferred form of motor having a stator with three windings (or phases) A, B and C and six salient poles. Other stator configurations could be used. The motor has a four pole permanent magnet rotor, although a different number of poles could be adopted. The windings A, B and C are connected together in star configuration in this embodiment as indicated in FIG. 3.

Figures 1, 2:
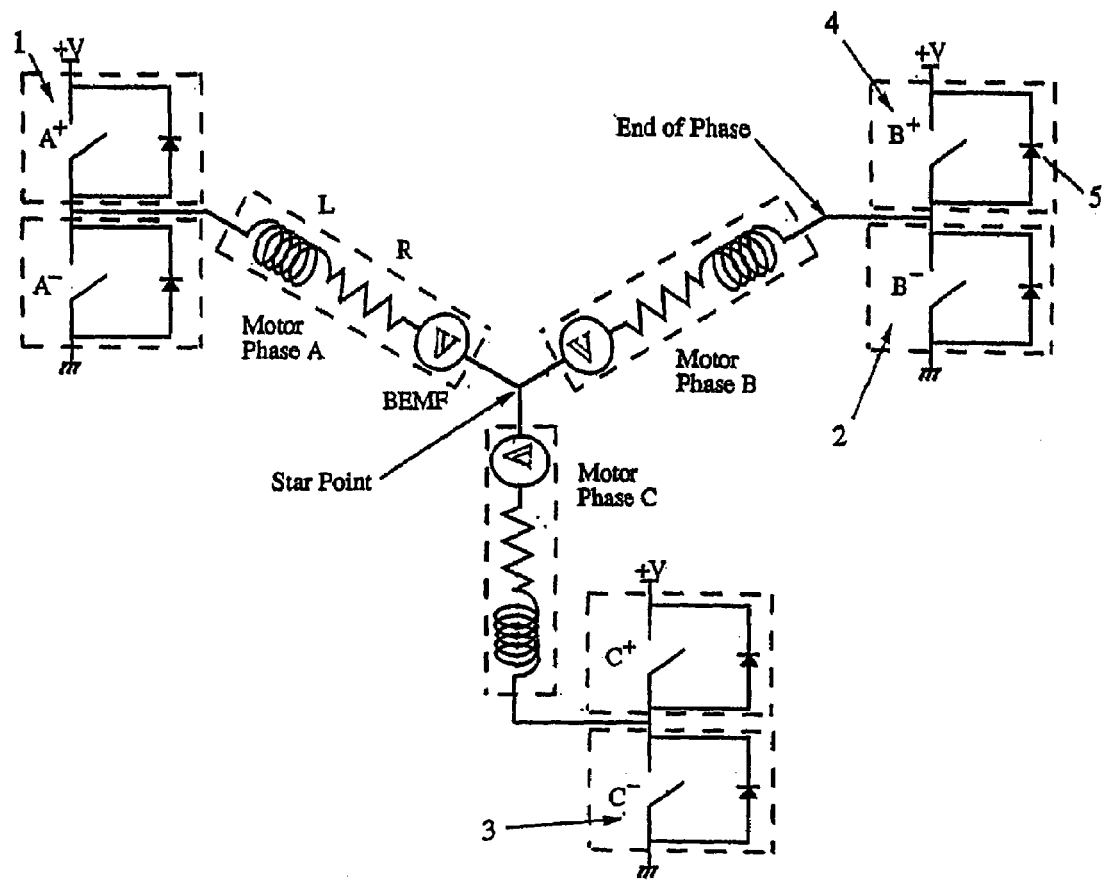
FIG. 1 is a simplified circuit diagram of an electronically commutated three winding brushless DC motor.
FIG. 2 shows the sequence of commutation switch states for two phase firing to cause clockwise rotation of the motor of FIG. 1.

The motor drive (inverter or commutation circuit) 22 includes pairs of switching devices in the form of IGBTs or power field effect transistors (FETs) which are connected across the direct current power supply 23 in a bridge configuration to commutate each of windings A, B and C in the manner already described with reference to FIGS. 1 and 2 where they are designed A+/A−, B+/B− and C+/C−. The winding inductances ensure the winding current that results is more sinusoidal than the rectangular voltage waveforms. Each of the six switching devices making up the upper and lower switches for each motor phase is switched by gate signals a+, a−, b+, b−, c+, c− produced by microcomputer 25. DC power supply 23 supplies the DC voltage which is applied across each switching device pair.

Figure 4:
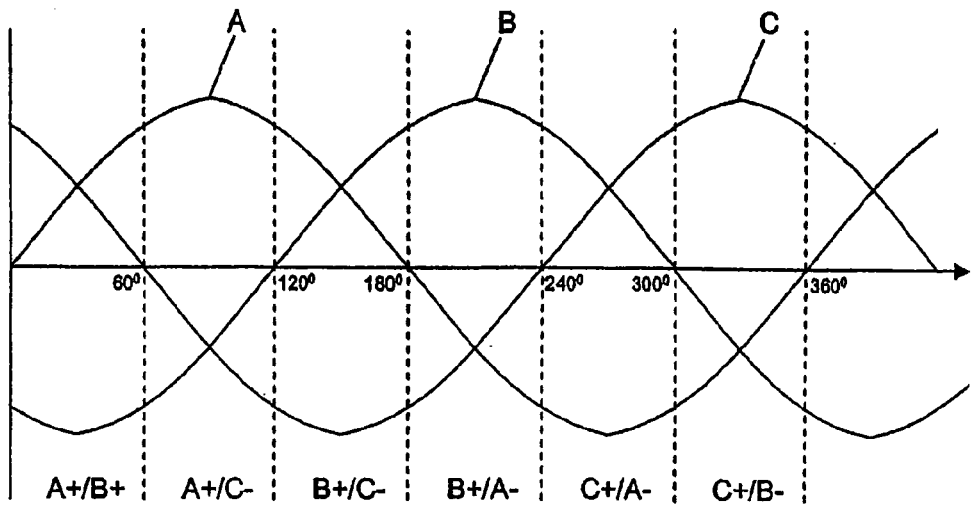
FIG. 4(a) is a waveform diagram showing the idealised drive currents flowing through the three windings of the motor.
FIG. 4(b) is a corresponding waveform diagram showing the voltage across the single sensed winding of the motor of FIG. 3.
FIG. 4(c) is a corresponding waveform diagram showing the digitised form of the voltage waveform shown in FIG. 4(b)
Figure 4:
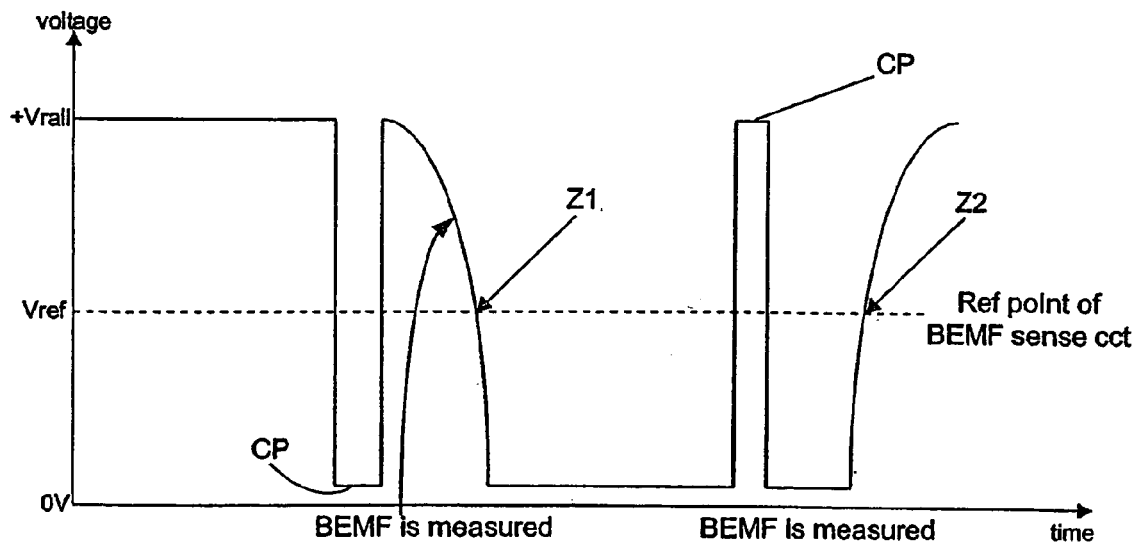
Figure 4:
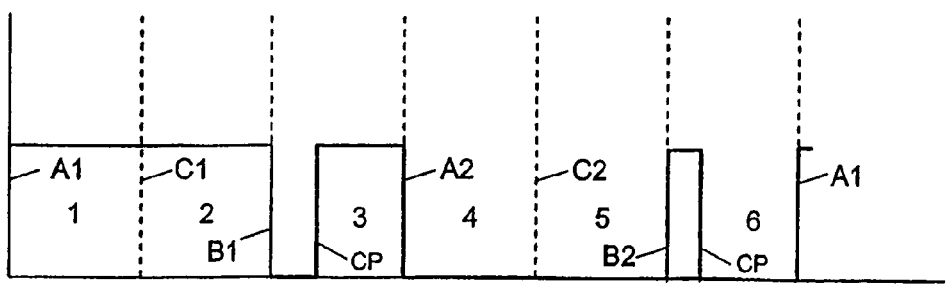

BEMF digitiser 24 receives an input signal from the switched end of motor phase A for the purposes of monitoring the back EMF induced by rotation of the rotor which provides rotor position information. In the preferred embodiment only the output from a single motor winding (in this example winding A) is used for this purpose as disclosed in WO 2005/062460. BEMF digitiser 24 supplies at its output a digital signal (see FIG. 4(c)) representative of the analogue signal at its input (see FIG. 4(b)) and derives the logic levels by comparator techniques as will be described. The digital output signal will include periodic logic transitions A1 and A2 which correspond to the "zero crossings" Z1 and Z2 of the analogue BEMF voltage induced in phase winding A as a rotor pole passes a winding pole associated with that phase.

Figure 5:
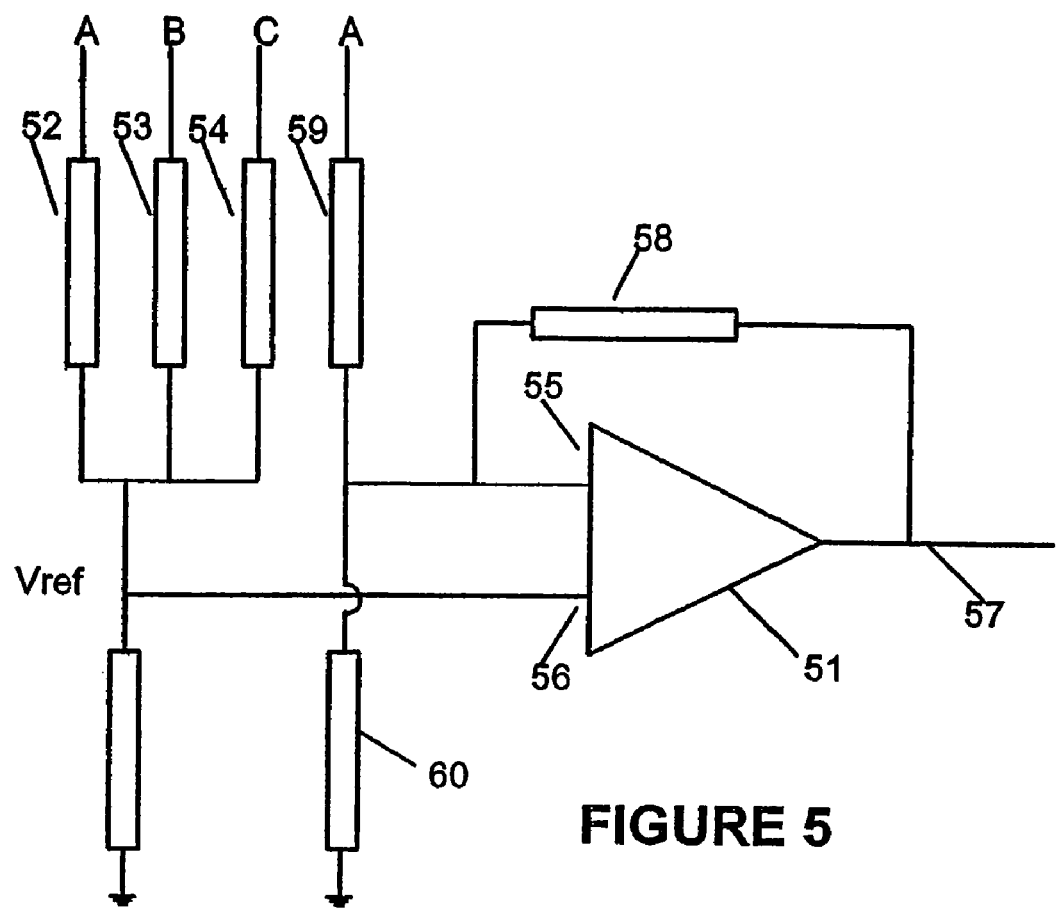
FIG. 5 is a circuit diagram for the back EMF digitiser shown in FIG. 3.

The BEMF digitiser 24 may be implemented in hardware as shown in FIG. 5 and disclosed in WO 2005/062460 (incorporated herein by reference) or may be implemented in software in microprocessor 25.

The basic microcomputer software functions required to operate the motor will now be described with reference to FIG. 3 to provide background to the inventive concepts which will be described separately. A start routine 30 causes the commutation control pulse generator 29 to produce pulses on output ports a+ to c− reflecting the switch patterns shown in FIG. 2. Each of the six switch patterns is successively retrieved in turn from memory 28. Control pulses for the commutation switches are synthesised by the commutation control pulse generator routine 29 which includes a pointer value which points to the location of the switching state pattern in table 28 which is required to produce the next commutation for the particular direction of rotation required of motor 21. Six commutation drive signals are required to be synthesised although only two of these change state on each commutation. The switch patterns are cycled continuously at a low speed to produce a stator flux which rotates at the same speed to induce the rotor to rotate and synchronise with that speed.

Various known techniques for checking for rotor synchronism within rotating stator flux during the open loop startup phase may be used, although in the preferred embodiment the technique disclosed in WO 2005/062460 is used.

Once rotor synchronism has been detected commutation control is triggered by the logic transitions in the back EMF signal at input port 27 in a closed loop mode and the start routine exited. Commutations may be triggered by actual detected zero-crossings in the BEMF signal in the currently unused winding or, where only one winding is monitored as in the preferred embodiment (eg winding A), the logic transitions A1 and A2 in signal 45 are directly used while triggers for the commutation control pulse generator 29 for phases B and C must be derived by extrapolation as disclosed in WO 2005/062460.

Speed control of the motor when running under closed loop control is achieved in the manner disclosed in U.S. Pat. No. 6,034,493. That is, the synthesised commutation control pulses are pulse width modulated when being supplied to the commutation circuit 22. A routine 32 imposes a duty cycle on the pulses which are synthesised by routine 29 appropriate to the commutation devices through which motor current is to flow in accordance with the present value of duty cycle held in location 33. The duty cycle is varied to vary the applied voltage across the stator windings to accelerate and decelerate motor 21 and to accommodate varying loads on the rotor since rotor torque is proportional to motor current and this is determined by the duty cycle of the pulse width modulation (PWM). In some applications it may be sufficient to only pulse width modulate the lower bridge devices in the commutation circuit 22.

Noise Reduction

Figure 7:
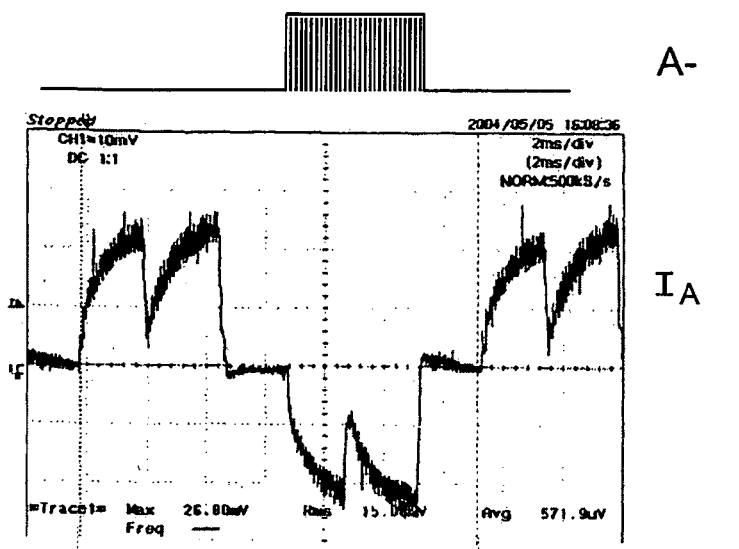
FIG. 7 is a waveform diagram showing winding current in a two phase activated motor with pulse width modulation of only the lower switching devices in the motor drive and corresponding drive voltage for the lower switching device connected to that winding.

The current waveform for one winding (or phase)—in this case phase A—of a two phase activated back EMF sensing motor with pulse width modulation of the lower switching devices only is shown in FIG. 7 along with the switching input signal for the lower switching device in the bridge for that phase (A−). It will be noted that the current waveform $I_A$ is far from sinusoidal and this results in perturbations in the motor torque and hence vibrations which may produce an unacceptable level and quality of motor noise.

If the current waveform $I_A$ is made to more closely approximate a sinusoid then motor noise will be reduced. The present invention proposes a methodology to achieve this with modest implementation costs. Referring to FIG. 7 the main departures of waveform $I_A$ from sinusoidal can be attributed to the notch in the maximum current amplitude excursions and the steep decay of current to zero prior to polarity reversal.

Figure 9:
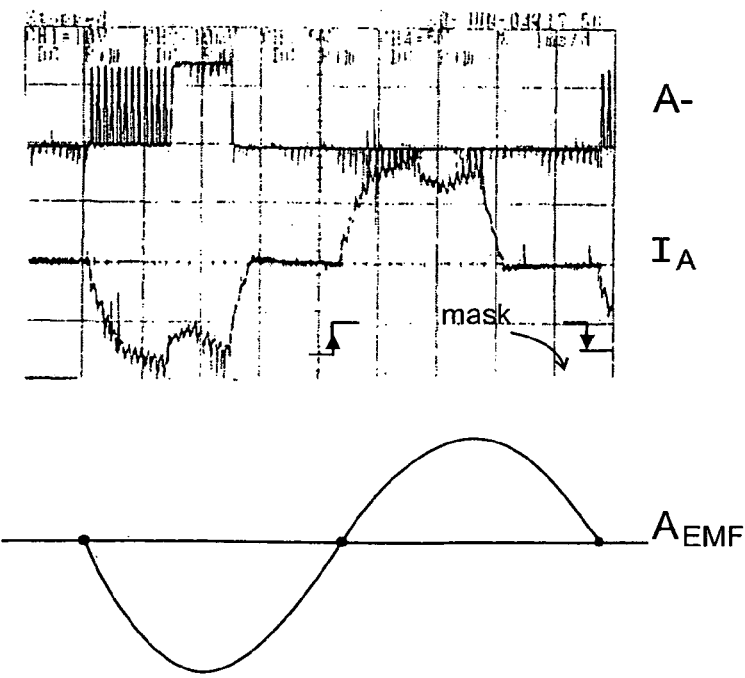
FIG. 9 is a waveform diagram showing winding current in a two phase activated motor with pulse width modulation being rotated between the upper and lower switching devices in the motor drive and corresponding drive voltage for the lower switching device connected to that winding.

The latter deficiency can be improved by pulse width modulation of the high side bridge switches in addition to the low side switches, but with PWM not being applied to all switching devices whenever they are on, but rather by rotating pulse width modulation from a high side switch to a low side switch following each commutation. Rotating the application of PWM means that on one commutation PWM is applied to a high side switch and on the following commutation PWM is applied to a low side switch. This is implemented by PWMing the newly switched on switching device in each commutation (ie. each newly implemented switching pattern in FIG. 8). PWM rotation ensures the phase current remains symmetrical. The switching patterns for such two phase activation with rotating PWM is shown in FIG. 8. The result of PWM rotation on the current waveform is shown in FIG. 9. The current decay time from peak to zero has now been increased. This is due to the PWM strategy providing consistent and low opposing voltage across the "freewheeling" recently turned off phase where reverse current flows through the corresponding parallel diode.

The present invention also provides for elimination of the notch in the current waveform peak values. This is achieved by activating the third phase for a period for less than the full commutation period (that is less than 60° flux rotation angle) so as to ensure the phase is inactivated in the region of the back EMF zero crossing. This pseudo three phase activation allows back EMF zero crossing detection to be used while obtaining some of the advantages of three phase activation.

Figure 10:
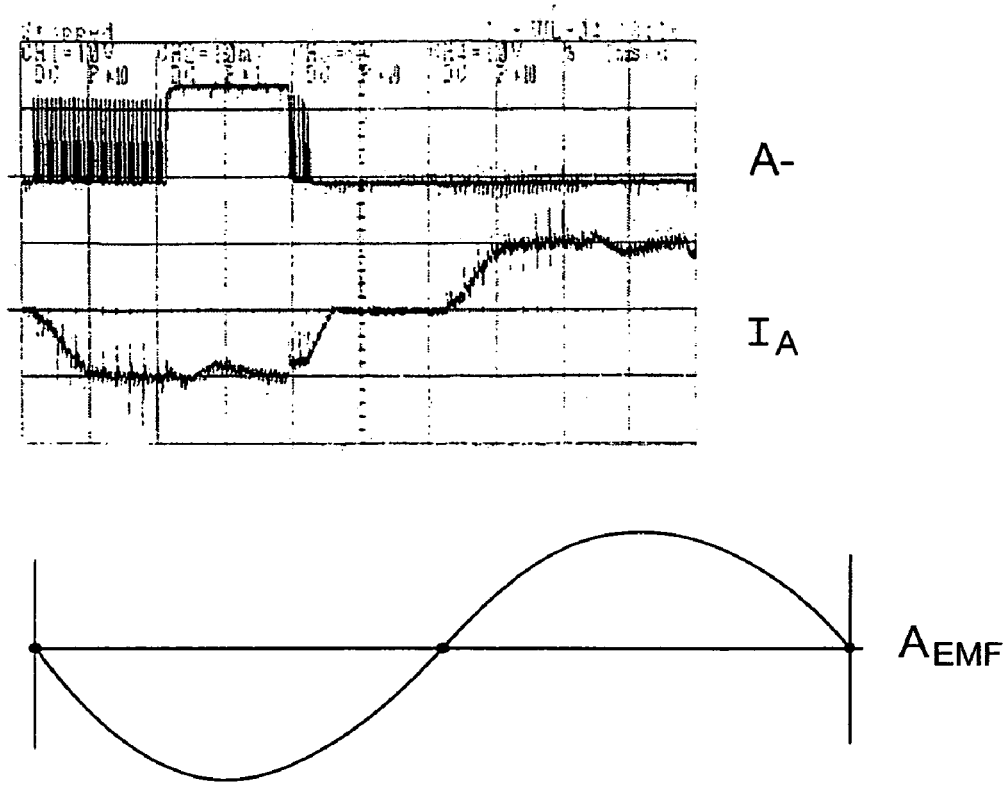
FIG. 10 is a waveform diagram showing winding current in a pseudo three phase activated motor with pulse width modulation being rotated between the upper and lower switching devices in the motor drive and corresponding drive voltage for the lower switching device connected to that winding.

The waveforms for partial activation of the third phase (pseudo-three phase activation) when it would normally be off are shown for phase A in FIG. 10. It will be seen that the A− switching device is turned on (and pulse width modulated) in the 120° to 180° flux rotation sector for a short period (i.e. after the 60° to 120° sector when it is continuously ON) when it would normally have been turned off following its being switched on for the preceding two 60° sectors. It will be noted that the notch at peak value of phase current $I_A$ has now been substantially corrected.

Together with the increased current decay time from peak values achieved by rotating the pulse width modulation a substantially trapezoidal current waveform is produced. Such a motor current waveform leads to considerably reduced torque perturbations and therefore considerably reduced motor noise. In addition because the waveform is more symmetrical with second harmonic distortion reduced, such residual noise as exists is less offensive to the human ear.

Activation of three phases also reduces peak winding currents. This reduces heat dissipated in the switching devices. This in turn allows for a higher switching frequency which also serves to reduce motor noise.

Figure 12:
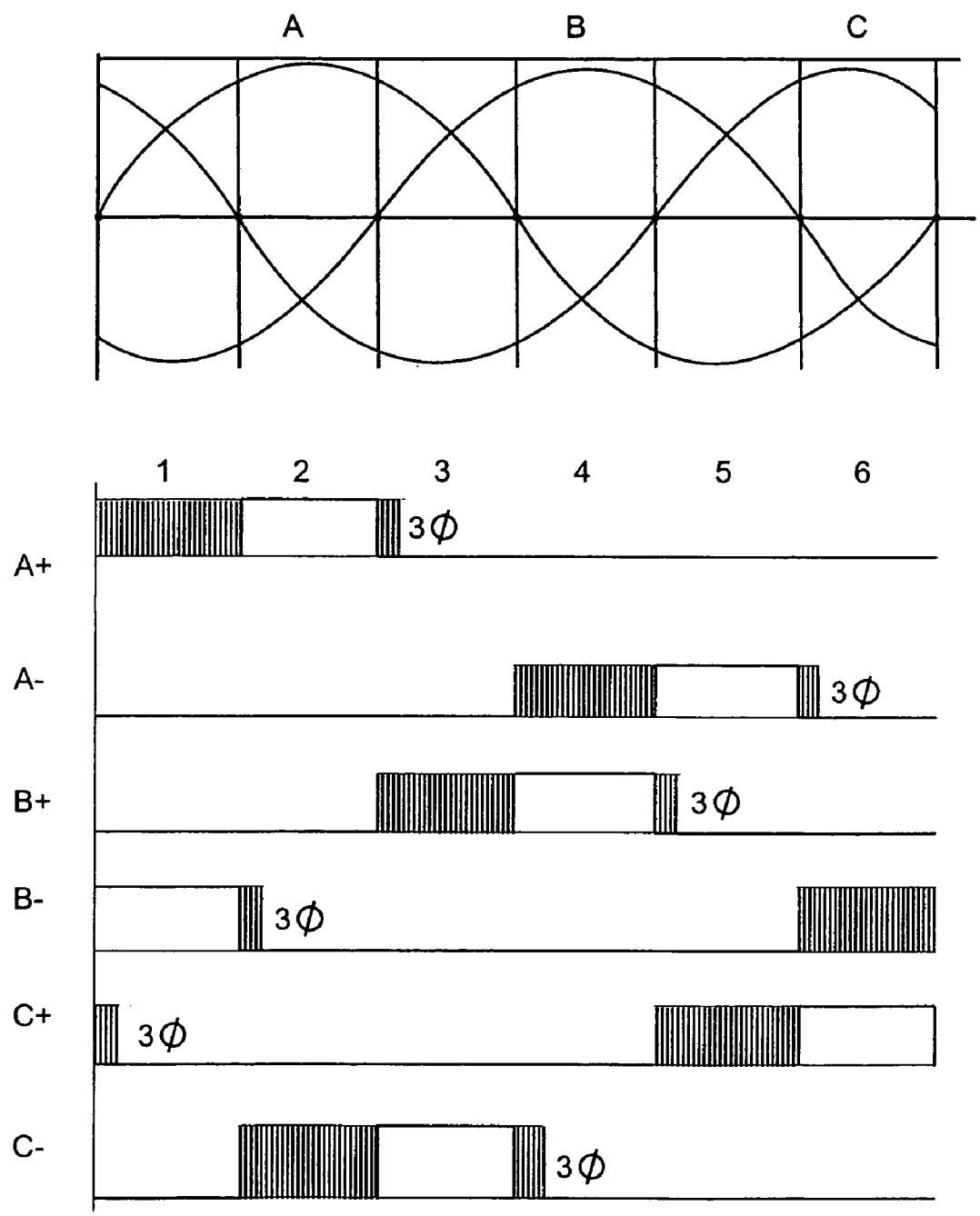
FIG. 12 is a waveform diagram showing drive voltage for upper and lower switching devices for all three phases during a full cycle for a pseudo three phase activated motor according to the present invention.

The waveforms for the switching device driving signals for pseudo three phase activation of the motor (and rotating PWM) are shown in FIG. 12 and the corresponding switch pattern table is shown in FIG. 11 with switch ON periods less than 60° being indicated by the use of square brackets. In pseudo three phase activation, depending on the particular switch pattern, either two high side or two low side switching devices are ON. The two switching devices on the same level (upper or lower) are those which are pulse width modulated to avoid circulating currents which distort the current waveform and reduce efficiency when switches on opposite levels are simultaneously pulse width modulated. It is important that when the third phase is activated that its pulse width modulated ON period is terminated sufficiently in advance of the potential zero crossing time of the rotor generated back EMF.

In a simple implementation the ON period is fixed—say 300 μS. Preferably the third phase activation time is varied with motor speed thereby improving the current waveform smoothing. The computed value of third phase activation time must be subject to modification to maintain a predetermined minimum head space between the termination of phase current decay to zero and the point of back EMF zero crossing. This is particularly significant as the current decay period is proportional to the forward current which itself is proportional to the motor load.

In applications where some residual noise can be tolerated, savings can be made by using a common PWM duty cycle for all three phases. If a more sinusoidal waveform is required for reduced noise independent control of PWM duty cycles for each phase through each of the three commutations per half cycle can be employed.

By such means waveform distortion due to ensuring necessary off time for back EMF sensing and currents ramping up and down too fast or too slow can be compensated. The PWM duty cycles in this technique are pre-stored using values derived empirically or from a model and vary motor speed.

The low noise motor strategy described above is implemented by software routines in the motor control microprocessor shown in FIG. 3 will now be described.

An End of Current Pulse routine 51 detects the completion of the current pulse at the selected time interval, from the filtered digitized back EMF signal from routine 48.

A Phase Conduction Control routine 49 calculates the reduced conduction time for the third phase and passes it to Phase Conduction Timer routine 50. This time is based on motor speed and routine 49 accepts speed data from routine 34. In a simpler embodiment with a less powerful microcomputer this time may be fixed, say at 300 μS, and routine 49 is not required.

Commutation data from routine 29 provides the start time for the third phase conduction time and this is passed to the Phase Conduction timer routine 50. Routine 49 also measures the time between current pulse termination to zero crossing detect by signals from End of Ipulse detect routine 51 and from routine 46. If a predetermined time margin is compromised it sends a signal to routine 33 to reduce PWM duty cycle on all phases to avoid loss of synchronism.

In a more complete embodiment routine 49 sends a signal to routine 33 to modify PWM on each phase independently at commutation angle intervals to produce a motor current which more accurately approximates a sinusoid. To do this routine 49 requires switching device state patterns from routine 29.

The Phase Conduction Timer routine 50 disables BEMF signal from being analysed while third phase conduction occurs by sending a signal to routine 48. It also turns off PWM on the active third phase when phase conduction time has elapsed by signal to PWM duty cycle routine 33.

The invention claimed is:

1. A method of electronically commutating current to a permanent magnet rotor brushless dc motor having three phase stator windings for producing rotating magnetic flux, a three phase bridge inverter including a pair of series connected switching devices per phase and wherein motor torque is controlled by pulse width modulation of said motor current comprising the steps of:
   controlling said switching devices to commutate current through successive combinations of three of said windings such that magnetic flux produced by said stator windings rotates in a desired direction by 60° per commutation at a speed inversely proportional to the period between commutations,
   controlling motor torque and speed by pulse width modulating the operation of that switching device which has been switched from an off state to an on state on each new commutation,
   applying voltage to one out of said three windings on each new commutation for an active period less than the period between commutations,
   after expiry of said active period sensing in said one of said windings the periodic back EMF induced by rotation of the permanent magnet rotor,
   digitising said sensed back EMF signal by detecting the zero-crossings of said back EMF signal,
   and causing each said commutation to occur at times which are substantially defined by or derived from each logic transition in said digitised signal due to zero crossings.

2. A method according to claim 1 wherein the active period when voltage is applied to said one out of three winding on each new commutation is a function of motor speed.

3. A method according to claim 1 wherein the active period when voltage applied to said one out of three winding on each new commutation is fixed.

4. A method according to any one of claims 1 to 3 wherein the time between the expiring of said active period when voltage is applied to said one out of three windings until the subsequent back EMF zero-crossing is detected and if said time is less than a predetermined value the duty cycle of said pulse width modulation is reduced.

5. A method according to any one of claims 1 to 3 wherein the pulse width modulation duty cycle is independently controlled for each phase and varied with motor speed to compensate for non-symmetrical activation of said three phases and thereby produce winding currents which better approximate sinusoids.

6. An electronically commutated brushless dc motor comprising:
   a stator having three phase windings adapted to be selectively commutated to produce a rotating magnetic flux,
   a rotor rotated by said rotating magnetic flux;
   a three phase bridge inverter including a pair of series connected switching devices per phase with the junctions of said switching devices connected to respective stator windings;
   digitising means coupled to one or more of said windings for digitising the back EMF induced in said one or more windings by detecting the zero crossings of said back EMF signal; and
   a microcomputer operating under stored program control, said microcomputer receiving said digitized back EMF signal and outputting switching signals for said switching devices, said microcomputer storing sequences of switching device state patterns for execution to produce switching signals to cause current to be commutated through successive combinations of all three of said windings such that magnetic flux produced by said stator windings rotates in a desired direction by 60° per commutation at a speed inversely proportional to the period between commutations; and
   said stored program including routines for:
   controlling motor torque and speed by pulse width modulating the switching signal for the switching device which has been switched from an off state to an on state on when the next switching pattern of said sequence is executed on each new commutation,
   controlling the duration of the applied voltage to one only of said three windings on each new commutation for an active period less than the period between commutations,
   activating said digitising means after expiry of said active period;

and causing each said commutation to occur at times which are substantially defined by or derived from each logic transition in said digitised signal due to zero crossings.

7. A motor according to claim 6 wherein said microcomputer includes:
a speed sensing routine which receives an input from said back EMF digitiser and outputs a value indicative of motor speed and a routine which receives said speed value and controls the duration of the active period when voltage is applied to said one out of three windings of each new commutation as a function of motor speed.

8. A motor according to claim 6 wherein said microcomputer stores a predetermined value indicative of the duration of the active period when voltage is applied to said one out of three windings on each new commutation and a routine which receives said speed value and controls the duration of said active period in accordance with said stored predetermined value.

9. A motor according to any one of claims 6 to 8 wherein said microcomputer stores a predetermined safe value of time between the expiration of applied voltage and the subsequent zero-crossing and includes a routine which measures the time between the removal of the applied voltage from the winding which is commutated for less than the next back EMF zero-crossing and if this time is less than said safe value outputs a signal to said pulse width modulation routine to cause that routine to reduce the duty cycle of said pulse width modulation.

10. A motor according to either of claims 7 and 8 wherein said microcomputer stores a set of duty cycle values for each phase for different motor speeds which determine the duty cycle of the pulse width modulation of that phase at different times within a cycle and said pulse width modulation routine receives speed values from said speed sensing routine and pulse width modulates the signals for each switching device in accordance with said stored duty cycle values and said speed value to produce winding currents which better approximate sinusoids.

11. A washing appliance pump including:
a housing having a liquid inlet and a liquid outlet,
an impeller located in said housing, and
an electronically commutated motor which rotates said impeller, said electronically commutated motor comprising:
a stator having three phase windings adapted to be selectively commutated to produce a rotating magnetic flux,
a rotor rotated by said rotating magnetic flux;
a three phase bridge inverter including a pair of series connected switching devices per phase with the junctions of said switching devices connected to respective stator windings;
digitising means coupled to one or more of said windings for digitising the back EMF induced in said one or more windings by detecting the zero crossings of said back EMF signal; and
a microcomputer operating under stored program control, said microcomputer receiving said digitized back EMF signal and outputting switching signals for said switching devices, said microcomputer storing sequences of switching device state patterns for execution to produce switching signals to cause current to be commutated through successive combinations of all three of said windings such that magnetic flux produced by said stator windings rotates in a desired direction by 60° per commutation at a speed inversely proportional to the period between commutations; and
said stored program including routines for:
controlling motor torque and speed by pulse width modulating the switching signal for the switching device which has been switched from an off state to an on state on when the next switching pattern of said sequence is executed on each new commutation,
controlling the duration of the applied voltage to one only of said three windings on each new commutation for an active period less than the period between commutations,
activating said digitising means after expiry of said active period;
and causing each said commutation to occur at times which are substantially defined by or derived from each logic transition in said digitised signal due to zero crossings.

12. A three winding brushless dc motor drive comprising:
a three phase bridge inverter including a pair of series connected switching devices per phase with the junctions of said switching devices adapted to be connected to respective stator windings of said motor;
digitising means adapted to be coupled to one or more of said windings for digitising the back EMF induced in said one or more windings by detecting the zero crossings of said back EMF signal; and
a microcomputer operating under stored program control, said microcomputer receiving said digitized back EMF signal and outputting switching signals for said switching devices, said microcomputer storing sequences of switching device state patterns for execution to produce switching signals to cause current to be commutated through successive combinations of all three of said windings such that magnetic flux produced by said stator windings rotates in a desired direction by 60° per commutation at a speed inversely proportional to the period between commutations; and
said stored program including routines for:
controlling motor torque and speed by pulse width modulating the switching signal for the switching device which has been switched from an off state to an on state when the next switching pattern of said sequence is executed on each new commutation,
controlling the duration of the applied voltage to one only of said three windings on each new commutation for an active period less than the period between commutations,
activating said digitising means after expiry of said active period;
and causing each said commutation to occur at times which are substantially defined by or derived from each logic transition in said digitised signal due to zero crossings.

* * * * *